United States Patent
Buccino et al.

(10) Patent No.: US 6,237,576 B1
(45) Date of Patent: May 29, 2001

(54) ON DEMAND/MULTI-FUEL/VAPOR DELIVERY SYSTEM

(76) Inventors: Giuseppe Buccino; Virginia Buccino, both c/o SciDynamic Industries, Inc., 1026 Main St., Klamath Falls, OR (US) 97061

(*) Notice: Subject to any disclaimer, the term of this patent is extended or adjusted under 35 U.S.C. 154(b) by 0 days.

(21) Appl. No.: 09/518,563

(22) Filed: Mar. 3, 2000

Related U.S. Application Data

(60) Provisional application No. 60/177,834, filed on Jan. 25, 2000.

(51) Int. Cl.7 .................................................. F02M 27/04
(52) U.S. Cl. ............................... 123/549; 123/538
(58) Field of Search .................................. 123/549, 537, 123/536, 538

(56) References Cited

U.S. PATENT DOCUMENTS

| 4,064,852 | * | 12/1977 | Fulenwider | 123/549 |
| 5,070,852 | * | 12/1991 | Po et al. | 123/549 |
| 5,876,195 | | 3/1999 | Early . | |

* cited by examiner

Primary Examiner—Marguerite McMahon
(74) Attorney, Agent, or Firm—Marger Johnson & McCollom, PC

(57) ABSTRACT

A fuel vaporization delivery system that includes a vaporization chamber and an RF magnetic inductive heating source for heating the vaporization chamber. Liquid fuel is converted to a vapor form, for delivery to engine cylinders.

15 Claims, 1 Drawing Sheet

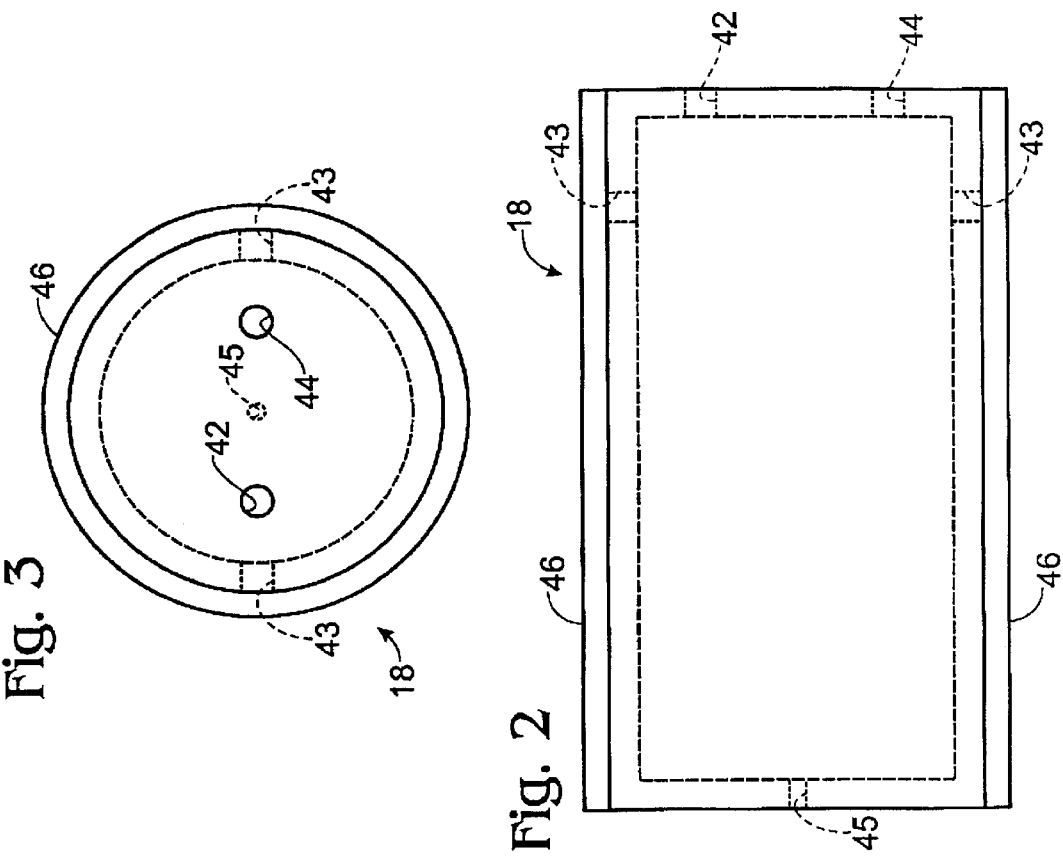
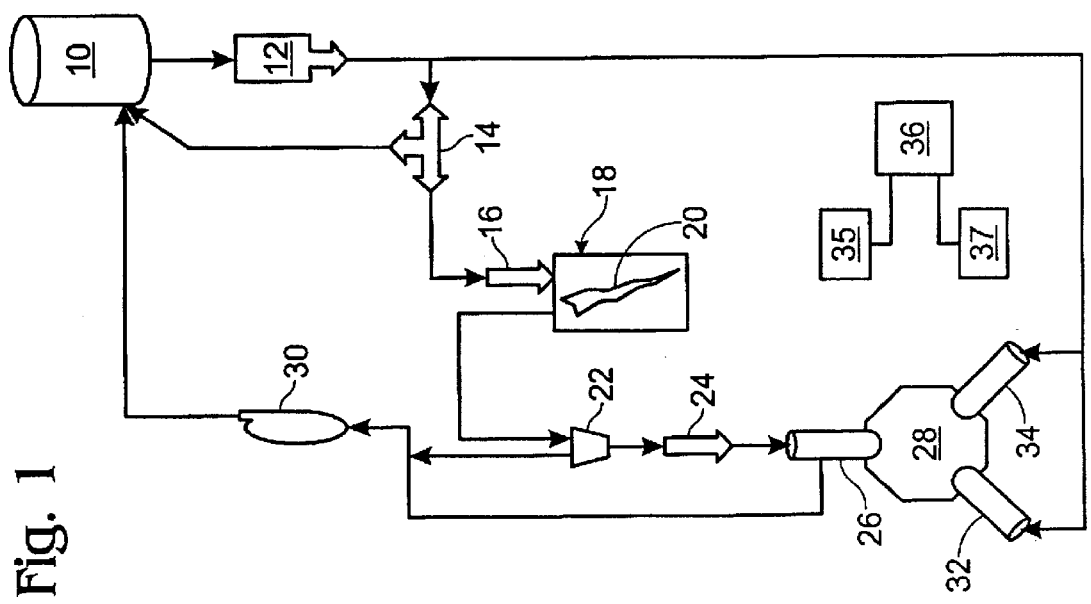
Fig. 3
Fig. 2
Fig. 1

ON DEMAND/MULTI-FUEL/VAPOR DELIVERY SYSTEM

This application claims benefit to Provision Application 60/177,834 filed Jan. 25, 2000.

BACKGROUND OF THE INVENTION

This invention relates to engines, and more particularly to an improved engine system employing a vaporized fuel delivery system.

Heretofore, typical engine fuel delivery systems have supplied liquid fuel and system/ambient temperature to either fuel injection systems or, with older vehicles, to naturally aspirated carburetion. However, the internal combustion engine employing such fuel delivery has major drawbacks pertaining to air quality standards. The millions of vehicles producing exhaust emissions affect worldwide populations with changes to weather patterns. Also, people are developing new health reactions due to dangerous levels of these exhaust emissions. Further, poor air quality is responsible for the deterioration of natural products such as rubber, buildings, statues and the like. Dangerously high levels of ground level ozone are present in many areas, while upper atmosphere ozone layers are being depleted, fueling concerns about ultraviolet rays from the sun.

These prior systems use liquid fuel delivered to an internal combustion engine. The fuel is sprayed as a liquid mist in to an intake manifold. As the fuel is atomized, upon entry to the intake manifold, it is hoped that the mist will eventually be converted to a vapor when exposed to a partial vacuum within the intake manifold on its way to the combustion chamber. The partial vacuum naturally lowers the boiling point of the liquid fuel. Prior attempts have been made to produce a 100% vaporized fuel, delivered separately to each cylinder of an engine. However, heretofore, these systems have not been successful.

SUMMARY OF THE INVENTION

In accordance with the invention, an improved fuel delivery system employs pre-vaporization of a fuel, suitably by RF inductive heating. The vaporized fuel is provided to the engine intake or to the cylinders.

Accordingly, it is an object of the present invention to provide an improved engine fuel delivery system that results in a significant reduction of tailpipe emissions.

It is a further object of the present invention to provide a clean air solution for diesel, LPG and gasoline power engines.

It is yet another object of the present invention to provide an improved engine with reduced fuel consumption and operating costs.

Yet another object of the invention is to provide an improved engine system with lower buildup of carbon and other foreign matter in the engine.

A further object of the present invention is to provide an improved engine with significant extension of vehicle maintenance cycle.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a block diagram of the overall engine fuel delivery system according to the present invention;

FIG. 2 is a side sectional view of a fuel vaporizer according to the invention; and FIG. 3 is an end view of the fuel vaporizer of FIG. 2, taken in the direction of arrow 3 in FIG. 2.

DETAILED DESCRIPTION

The system according to a preferred embodiment of the present invention comprises an RF magnetic induction heated vaporizer that converts fuel to a vapor. The vaporized fuel is then introduced into the intake manifold of the engine or to the cylinders by fuel injection methods. The system is sealed, whereby any fuel vapor not consumed by the engine is recycled and collected for future use.

Referring to FIG. 1, a block diagram of the overall engine fuel delivery system according to the present invention, a fuel tank 10 stores the particular fuel, which may be gasoline or diesel, or the like. A fuel pump 12 draws fuel from the tank, supplying it to a liquid fuel control valve 14 (LFCV). Fuel flows from the LFCV to an injector 16, while also flowing from the LFCV in a feedback loop to the fuel tank. The LFCV serves to regulate the amount of fuel supplied to the injector 16, as dictated by fuel demand, returning excess fuel for re-use. The injector supplies fuel into a vaporizer 18, which is suitably provided with heaters 20, for heating the vaporizer body as discussed hereinbelow. Output from the vaporizer (which suitably comprises fuel vapor) is supplied to pressure regulator 22, the output thereof feeding to a safety valve 24. The safety valve is in-line and serves as a one-way check valve as it supplies fuel vapor to injector 26, which injects the vaporized fuel into an intake manifold 28, so that an engine is thereby provided with fuel. The injector is also in fluid communication with a condenser 30 (as is also the pressure regulator 22), the condenser being further connected to the fuel tank 10. An acceleration compensation (AC) injector 32 and cold start enrichment (CSE) injector 34 are also in fluid communication with the intake manifold, and receive fuel input from the fuel pump 12. A processor 36 is provided for control, receiving input from sensors 35 monitoring the operation of the system and controlling the operation via output actuators 37.

In operation, fuel from the tank 10 is drawn out by the fuel pump, passing through the liquid fuel control valve to injector 16. The injector supplies the fuel into the vaporizer 18, which is suitably heated to a sufficient temperature by heaters 20 to cause the liquid fuel to convert to a vaporized state, suitably 200 to 300 degrees F. Of course, the specific temperature can be modified depending on the type of fuel in use for maximum vapor production. The vaporized fuel flows through the pressure regulator 22 and safety valve 24, into injector 26, which supplies the vaporized fuel to the intake manifold of the engine, under timing control of the processor 36. Vapor not used by the injector at a given moment is returned to the fuel tank via condenser 30, which converts the fuel vapor back to a liquid state. The pressure regulator also returns any excess fuel vapor to the fuel tank via condenser 30. The acceleration compensation injector provides additional fuel (suitably in a less vaporized or liquid form) directly to the engine by way of fuel injectors, in response to a rapid acceleration demand on the engine. Also, the old start enrichment injectors provide fuel during initial cold starts by use of a liquid fuel injector. Note that the acceleration compensation and the cold start enhancement injectors may suitably comprise a single injector, injecting fuel at a position of delivery where fuel is admitted into the fuel induction unit of the engine before the engine's throttle valve.

Referring now to FIG. 2 and FIG. 3, which are a side sectional and an end view respectively of a fuel vaporizer, the vaporizer suitably comprises a cylindrical shaped stainless steel member (suitably from 400 series stainless steel) having a hollow interior that is substantially sealed to the exterior. A fuel inlet 42 is provided in the cylinder end wall at one end of the vaporizer, suitably spaced in from the edge of the cylinder about $\frac{1}{4}^{th}$ the diameter of the cylinder body. Near the opposite side of the cylinder, a fuel vapor outlet 44 is provided, again, about $\frac{1}{4}^{th}$ the body diameter from the edge of the cylinder. Two sensor/gauge ports 43 are provided on the side wall of the vaporizer body nearest the end of the body having the fuel inlet and outlets, about $\frac{1}{6}^{th}$ the length of the cylinder from the cylinder end. At the end of the body distal from the sensor/gauge ports, a drain outlet 45 is provided, centrally located in the end wall. An RF magnetic inductive heater 46, suitably constructed in the form of a sleeve, surrounds the vaporizer body. Suitably, the RF magnetic inductive heater comprises a RF source coupling its energy to the vaporizer unit by means of an inductor. For example, the vaporizer unit is suitably positioned within the turns of a coil which is coupled to receive the output of the RF source. In FIG. 2 and FIG. 3, the RF magnetic inductive heater 46 is illustrated schematically, but suitably includes one or more coil members surrounding the body of the vaporizer. In a particular embodiment, a coil having two primary windings is employed. To enable access to the sensor/gauge ports 43, the RF magnetic inductive heater 46 is provided with openings, or is shaped to not cover the area of the ports 43.

In operation of the vaporizer, the RF magnetic inductive heater is driven to heat the vaporizer body, whereupon liquid state fuel injected into the interior of the vaporizer body (by injector 16 (FIG. 1)) is caused to become vapor form. The vaporized fuel is then supplied to operate the engine. Input of fuel to the vaporizer is regulated based on fuel demands.

Suitably, the RF magnetic inductive heater is operated at a frequency of between 50 and 80 kHz, with one kilowatt of power. Suitable dimensions for the vaporizer chamber 40 are between 5 and 12 inches in length, outer diameter of between 3 and 6 inches, with a wall thickness ranging from 0.065 to 0.25 inches. The end walls of the cylinder are also suitably between 0.065 and 0.25 inches thick and the inlet 42 and outlet 44 are $\frac{1}{4}^{th}$ the diameter of the cylinder from the outer circumference of the end wall. The sensor/gauge ports 43 are 1 inch from the end of the cylinder, or, alternatively, $\frac{1}{6}^{th}$ the overall length of the cylinder from the end wall, each comprising 0.25 inch tapped openings. Outlet 45 is suitably a 0.125 inch tapped opening.

In an alternative embodiment, the vaporizer is provided as a two-stage device, wherein a first stage employs a resistive heating element to pre-heat the fuel to a temperature above the ambient temperature. Then, the second stage, suitably comprising the RF magnetic inductive heated vaporizer, is employed for final vaporization of the fuel. The first stage may suitably comprise a reservoir of pre-heated fuel, to be drawn upon as needed.

FIG. 3 is a transparent end view of the fuel vaporizer of FIG. 2, taken in the direction of arrow 3 in FIG. 2. The placement of inlet 42, outlet 44 and sensor/gauge ports 43 are also shown in this view.

As will be understood by those in the art, the operation of an engine with the fuel vaporization delivery system installed thereon employs various sensors to measure certain engine operating variables, the timing and amount of vapor being controlled in relation to these variables. For example, manifold absolute pressure (MAP) sensor, throttle position sensor (TPS), oxygen sensor ($O_2$), coolant temperature sensor, outlet vapor pressure, inlet fuel pressure and ambient temperature sensor inputs are received and factored in to vary the amount of vapor produced. In a particular embodiment, inputs from the various sensors are weighted as follows: 30% MAP, 25% throttle, 15% $O_2$, and 10% coolant temperature. The remaining 20% can be factored from other various sensors. As more fuel is demanded, the processor 36 controls liquid fuel input to the vaporizer body to allow more liquid fuel to enter the vaporizer, thereby increasing the vaporized fuel output.

It will be appreciated that while the illustrated embodiment supplies the vaporized fuel to the intake manifold, the fuel may suitably be supplied directly to the cylinders by fuel injection, or the like.

Therefore, according to the invention, liquid fuel is converted to a heated vaporized fuel before it enters the engine, thus increasing fuel efficiency, reducing incomplete combustion, and resulting in the engine staying cleaner. The more complete use of the fuel reduces pollutants, such as unburned hydrocarbons.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A vaporized fuel delivery system for an internal combustion engine, comprising:
    a vaporizing chamber for receiving liquid fuel therein; and
    an RF magnetic inductive heating coil surrounding at least a portion of said vaporization chamber for vaporizing liquid fuel therein.

2. A vaporized fuel delivery system according to claim 1, wherein said vaporizing chamber comprises a cylindrical member having a hollow interior defining the chamber.

3. A vaporized fuel delivery system according to claim 2, wherein said vaporizing chamber comprises stainless steel.

4. A vaporized fuel delivery system according to claim 2, wherein said vaporizing chamber comprises 400 series stainless steel.

5. A vaporized fuel delivery system according to claim 1, wherein said vaporized fuel output is supplied to an intake manifold of an engine, for fueling thereof.

6. A vaporized fuel delivery system according to claim 1, further comprising a fuel enrichment circuit that is operable to dispense an enriched air fuel mixture during acceleration and cold start.

7. A vaporized fuel delivery system according to claim 6, wherein said momentary fuel enrichment circuit comprises a fuel injector.

8. A vaporized fuel delivery system according to claim 1, wherein said fuel comprises diesel.

9. A vaporized fuel delivery system according to claim 1, wherein said fuel comprises gasoline.

10. A vaporized fuel delivery system according to claim 1, wherein said fuel comprises LPG.

11. A vaporized fuel delivery system according to claim 1, further comprising a fuel pre-heater for heating fuel prior to introduction to the vaporizing chamber.

12. A vaporized fuel delivery system according to claim 11, wherein said fuel pre-heater is resistively heated.

13. A vaporized fuel delivery system according to claim 1, wherein said coil surrounding said vaporization chamber comprises plural primary windings.

14. A vaporized fuel delivery system according to claim 1, wherein said vaporization chamber is substantially cylindrical in shape.

15. A vaporized fuel delivery system according to claim 1, wherein the vaporizing chamber includes an outlet in communication with an intake portion of the engine.

* * * * *